United States Patent Office 3,008,999
Patented Nov. 14, 1961

3,008,999
STABILIZATION OF METHYLCHLOROFORM
Otto S. Kauder, Jamaica, N.Y., assignor to Argus Chemical Corporation, Brooklyn, N.Y., a corporation of New York
No Drawing. Filed Oct. 8, 1959, Ser. No. 845,100
5 Claims. (Cl. 260—652.5)

This invention relates to the process of cleaning metal articles with methyl chloroform, and to a methyl chloroform solvent stabilized against decomposition when used in such process.

The use of methyl chloroform (1,1,1-trichloroethane) in the following called MC, presents certain important advantages in degreasing operations, f.i. the relatively low degree of toxicity of this compound and also in the greater solvent economy, compared to carbon tetrachloride or trichloroethylene, due to the lower specific gravity. However, MC thus far has only enjoyed rather restricted commercial use, owing to insufficient stabilization. Thus MC has been used only in the relatively wasteful cleaning processes of dipping and spraying, and has secured almost no entry to the field of vapor degreasing which is more important from the economic viewpoint.

The principal stability problem with MC arises in contact with aluminum. Unstabilized MC in contact with a freshly exposed or scratched aluminum surface turns dark and begins to decompose within a few minutes. Additives conventionally used with trichloroethylene, such as the epoxides, aliphatic amines, and pyrroles, are without appreciable effect in stabilizing MC. The use of 1,4-dioxane, as disclosed in U.S. Patent 2,811,252, provides a certain degree of protection to MC in contact with aluminum, and affords a product of acceptable quality for the present use of metal cleaning by the cold dipping and spraying processes. However, MC stabilized with dioxane does not appear to be sufficiently stabilized for the more severe requirements of the vapor degreasing process, as will be shown in detail below.

MC stabilized for vapor degreasing should withstand prolonged contact of the boiling liquid and vapor with aluminum, and should also remain substantially unattacked by other degradative influences encountered in degreasing practice, such as oxygen, moisture, and the presence of other metals particularly zinc, iron and copper. In the absence of aluminum, these influences are not damaging to MC, but in combination with aluminum, they represent a severe problem, as will be shown in the examples.

It is therefore the object of this invention to provide a degreasing solvent comprising stabilized MC.

The object is accomplished by the use as stabilizer of 0.5–5%, preferably about 1–3% by weight of 1,3-dioxolane, the cyclic formal of ethylene glycol. This compound has the formula:

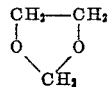

The compound has an excellent stabilizing effect. Its boiling point of 74° C. is extremely close to that of MC, maintaining complete stability when MC containing this stabilizer is vaporized or distilled.

Yet more advantageous results are obtained by using along with the 1,3-dioxolane stabilizer a very small quantity, 0.01–0.1%, of a material belonging to the class of phenolic antioxidants. In the absence of 1,3-dioxolane the phenolic antioxidants are totally without effect. Typical phenolic antioxidants are p-t-butyl phenol, 2,6-di-t-butyl-p-cresol, nonylphenol or 4,4'-thiobis-(t-butyl-m-cresol).

The following examples serve to illustrate the invention, but it should be understood that they are not given by way of limitation and that many changes in the details may be made without departing from the spirit of the invention.

We describe first the removal of stabilizer from commercial MC, stabilized with dioxane, since unstabilized MC is not commercially available. Each of four separatory funnels was charged with 200 ml. water. One liter of commercial MC was shaken with the water in the first funnel, allowed to separate, and drained into the second funnel. This operation was repeated until the MC was taken from the fourth funnel and dried over sodium sulfate. The resulting material gave an immediate reaction with a freshly scratched piece of aluminum foil. In the following examples percentages are indicated by weight.

EXAMPLE 1

Action of boiling MC on aluminum rods

Twenty-five ml. samples of MC were heated to reflux in a conical flask containing an aluminum welding rod about 2 inches long and weighing approximately 1 gram. At the end of the reflux test, the rods were reweighed.

MC without stabilizer showed complete decomposition in 2 hours.

MC stabilized with 2% 1.3 dioxolane exhibited no decomposition in 10 days and an Al weight loss of 0.03%.

EXAMPLE 2

Action of MC and water on aluminum rods

The reflux test of Example 1 was repeated, but the flasks were charged with 25 ml. MC and 25 ml. water. There was no visible decomposition of the solvent, but the aluminum rods were slowly attacked.

Al weight loss after 7 days: Percent
 MC containing 4% dioxane _____ 50.0
 MC containing 2% 1.3 dioxolane _____ 14.1

A similar test was run by shaking the flasks containing water, MC, and aluminum rods at room temperature.

Al weight loss after 10 days: Percent
 MC containing 4% dioxane _____ 14.6
 MC containing 2% 1.3 dioxolane _____ 5.2

EXAMPLE 3

Action of MC on metal combinations in the presence of oxygen and moisture

In this test, the oxidation apparatus described in the Federal Specification OT634A, "Trichloroethylene, technical" was used. Each test run was performed with 230 ml. MC, 5 g. aluminum in the form of ¼ inch pellets, and at least one other metal. The other metals used were mossy zinc, about 5 g. in a run, mild steel strips, 2 x ½ x ¹⁄₁₆ inch, and about 5 g. copper foil, 0.032 inch thick. Oxygen from a cylinder passed through a wash bottle and a bubble counter, both containing water, before entering the flask. The oxygen flow rate was about 30 bubbles per minute. A 150 watt electric light bulb was used to illuminate and heat the flasks.

At the end of the test period, after 72 hours, the metals were removed, washed once with water and once with acetone, and weighed to determine the weight change. The MC was analysed for chloride ion formed in the oxidation by the Volhard method.

| Formula | Metals used | Percent Cl | Metals weight change, percent |
|---|---|---|---|
| MC+4% dioxane | Al, Zn | 0.07 | Al 0.0, Zn−7.6. |
| MC+2% 1.3 dioxolane | Al, Zn | 0.03 | Al 0.0, Zn−3.8. |
| MC+4% dioxane | Al, Fe | 0.009 | Al−0.4, Fe−0.2. |
| MC+2% 1,3 dioxolane | Al, Fe | 0.01 | Al−0.2, Fe−0.1. |
| MC+4% dioxane | Al, Cu | 0.03 | Al+0.3, Cu−6.8. |
| MC+2% 1,3 dioxolane | Al, Cu | 0.01 | Al−0.3, Cu+1.1. |

These figures and the results of Example 2, show the superiority of 1,3-dioxolane as stabilizer compared to dioxane.

EXAMPLE 4

| Formula | Metals used | Percent Cl | Metals weight change, percent |
|---|---|---|---|
| MC+1.8% 1,3-dioxolane+0.05% Thiobis-t-butyl-m-cresol. | Al, Zn | 0.006 | Al 0.0, Zn−0.1. |
| Do | Al, Fe | 0.008 | Al 0.0, Fe−0.05. |
| Do | Al, Cu | 0.005 | Al+0.01, Cu+0.2. |

These figures show the synergistic effect when a minute quantity of thiobis-t-butyl-m-cresol is being used together with 1,3-dioxolane.

EXAMPLE 5

| Formula | Metals used | Percent Cl | metals weight change, percent |
|---|---|---|---|
| MC+1.8% 1,3-dioxolane+0.05% ethyl An-33 [1] | Al, Cu, Fe | 0.001 | Al+0.03, Cu−0.04, Fe−0.01. |
| MC+1.8% 1,3-dioxolane+0.05% thiobis-t-butyl-m-cresol. | Al, Cu, Fe | 0.001 | Al−0.01, Cu−0.02, Fe−0.01. |

[1] Ethyl An-33 is the trade mark for a commercially available mixture of t-butyl substituted phenols.

What is claimed is:
1. A stabilized composition consisting of methylchloroform having incorporated therein from 0.5 to 5% by weight of 1,3-dioxolane.
2. A stabilized composition consisting of methylchloroform having incorporated therein from 1 to 3% by weight of 1,3-dioxolane.
3. A stabilized composition consisting of methylchloroform having incorporated therein from 0.5 to 5% by weight of 1,3-dioxolane and in addition thereto 0.01 to 0.1% by weight of a phenolic antioxidant.
4. A stabilized composition consisting of methylchloroform having incorporated therein from 0.5 to 5% by weight of 1,3-dioxolane and in addition thereto 0.01 to 0.1% by weight of 4,4′-thiobis-2-t-butyl-5-methylphenol.
5. A stabilized composition consisting of methylchloroform having incorporated therein from 0.5 to 5% by weight of 1,3-dioxolane and in addition thereto a mixture of t-butyl substituted phenols containing 2,6-di-t-butylphenol 75%, 2,4,6-tri-t-butylphenol 10–15%, and ortho-t-butylphenol 10–15%.

References Cited in the file of this patent
UNITED STATES PATENTS

| | | |
|---|---|---|
| 2,371,645 | Aitchison et al. | Mar. 20, 1945 |
| 2,810,765 | Neuworth et al. | Oct. 22, 1957 |
| 2,841,625 | Burch et al. | July 1, 1958 |
| 2,852,572 | Shukys et al. | Sept. 16, 1958 |
| 2,922,776 | Wulff et al. | Jan. 26, 1960 |

Notice of Adverse Decision in Interference

In Interference No. 92,892 involving Patent No. 3,008,999, O. S. Kauder, STABILIZATION OF METHYLCHLOROFORM, final judgment adverse to the patentee was rendered Oct. 30, 1964, as to claims 1 and 2.
[*Official Gazette March 30, 1965.*]